(12) United States Patent
Achyuth et al.

(10) Patent No.: US 11,080,514 B2
(45) Date of Patent: Aug. 3, 2021

(54) FACIAL RECOGNITION BASED AUTO ZOOM

(71) Applicant: Citrix Systems, Inc., Fort Lauderdale, FL (US)

(72) Inventors: Nandikotkur Achyuth, Bangalore (IN); Divyansh Deora, Bangalore (IN); Arnav Akhoury, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 31 days.

(21) Appl. No.: 16/570,254

(22) Filed: Sep. 13, 2019

(65) Prior Publication Data

US 2021/0081648 A1 Mar. 18, 2021

(51) Int. Cl.
*G06K 9/00* (2006.01)
*G06T 7/70* (2017.01)
*G06T 3/00* (2006.01)

(52) U.S. Cl.
CPC ........ *G06K 9/00228* (2013.01); *G06T 3/0006* (2013.01); *G06T 3/0056* (2013.01); *G06T 7/70* (2017.01); *G06T 2207/30201* (2013.01); *G06T 2210/12* (2013.01)

(58) Field of Classification Search
CPC ........... G06K 9/00228; G06K 9/00222; G06K 9/00287; G06K 9/00281; G06K 9/00248; G06K 9/6407; G06K 9/2009; G06K 9/6423; G06K 9/6476; G06K 9/00084; G06T 7/001; G06T 7/70; G06F 17/30249
See application file for complete search history.

(56) References Cited

U.S. PATENT DOCUMENTS

| | | | | |
|---|---|---|---|---|
| 8,811,747 | B2* | 8/2014 | Ptucha | G06K 9/00228 382/195 |
| 9,129,148 | B1* | 9/2015 | Li | G06K 9/52 |
| 9,153,031 | B2* | 10/2015 | El-Saban | G06K 9/00228 |
| 9,224,060 | B1* | 12/2015 | Ramaswamy | G06K 9/00389 |
| 9,275,269 | B1* | 3/2016 | Li | G06K 9/00624 |
| 9,465,813 | B1* | 10/2016 | Li | G06F 16/122 |
| 9,495,736 | B2* | 11/2016 | Kawabata | G06F 16/583 |
| 9,524,418 | B2* | 12/2016 | Velozo | G06K 9/00771 |
| 9,645,641 | B2* | 5/2017 | Lee | G06F 3/04842 |
| 9,661,215 | B2* | 5/2017 | Sivan | H04N 5/2353 |
| 9,703,939 | B2* | 7/2017 | Tahk | H04N 1/00411 |
| 2017/0302880 | A1* | 10/2017 | Cizerle | A61B 5/4833 |
| 2018/0376057 | A1* | 12/2018 | Dey | H04N 5/23296 |

\* cited by examiner

*Primary Examiner* — Amir Alavi
(74) *Attorney, Agent, or Firm* — Hoffman Warnick LLC

(57) ABSTRACT

A smart device having a photo processing system, and a related program product and method for processing photos. The photo processing system includes: a detector that detects when a photo is displayed on the smart device; an auto capture system that captures a viewer image from a front facing camera on the smart device in response to detecting that the photo is being displayed; a facial matching system that determines whether the viewer image matches any face images in the photo; and an auto zoom system that enlarges and displays a matched face image from the photo.

20 Claims, 4 Drawing Sheets

Original Photo 40
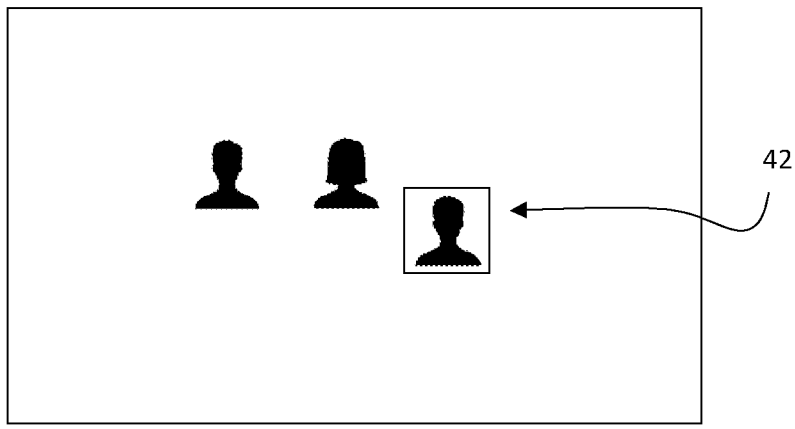
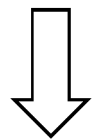 42
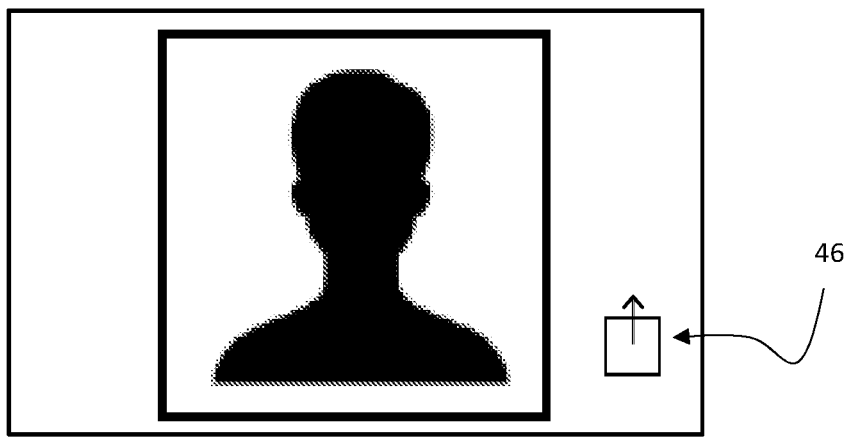 46
Auto Zoomed Photo 44
Figure 2

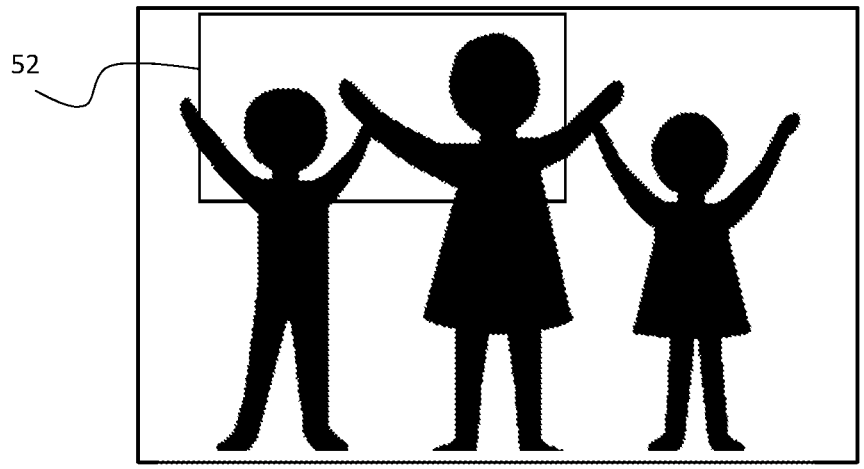
Original Photo 50
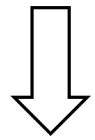
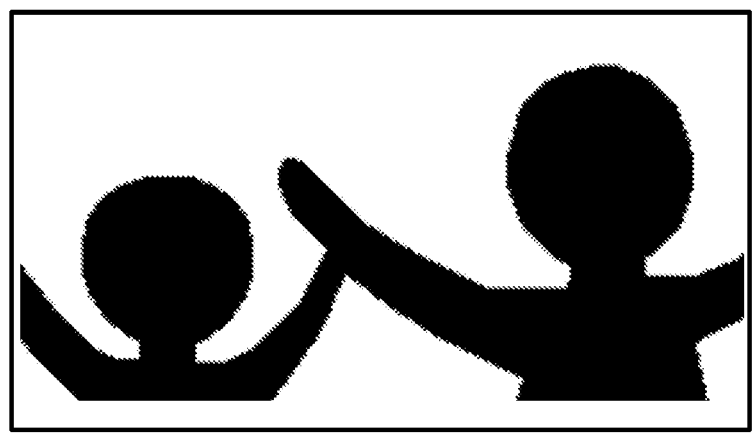
Auto Zoomed Photo 54
Figure 3

FACIAL RECOGNITION BASED AUTO ZOOM

BACKGROUND OF THE DISCLOSURE

Digital camera technology embedded in smartphones and the like has forever changed the manner in which people interact with photo images. Users can take, view, zoom, edit, and share pictures at virtually every moment throughout their day. It is estimated that over one trillion digital pictures are taken every year. Although any subject matter is fair game, group photos, e.g., of two or more family members, friends, coworkers, etc., remain one of the most popular subjects of digital photography.

After a group photo is captured with, e.g., a smartphone, it is not usual for the device to be passed around to allow all those in the photo to view the image. It is a natural tendency for the viewer to then look at themselves and perhaps zoom in on a portion of the image containing their own portrait to assess the picture quality.

BRIEF DESCRIPTION OF THE DISCLOSURE

Aspects of this disclosure provide a system, method and program product that utilizes a front facing camera and face detection algorithm on a smart device to determine if a person viewing a group photo on the smart device appears in the group photo. If the person appears in the group photo, the device will automatically zoom into that part of the picture that contains the viewer's portrait. This feature automates the technical problem of having to manually zoom an image, thus providing a technical solution that automatically displays a zoomed-in section of a group photo containing a person viewing the photo.

A first aspect of the disclosure provides a smart device having a photo processing system. The photo processing system includes a detector that detects when a photo is displayed on the smart device. Once detected, an auto capture system captures a viewer image from a front facing camera on the smart device and a facial matching system determines whether the viewer image matches any face images in the photo. If a match is detected, an auto zoom system enlarges and displays a matched face image from the photo.

A second aspect of the disclosure provides a computer program product stored on a computer readable storage medium, which when executed by a processor on a smart device, processes photos. The computer program product includes program code that detects when a photo is displayed on the smart device and program code that captures a viewer image from a front facing camera on the smart device in response to detecting that the photo is being displayed. Further included is program code that determines whether the viewer image matches any face images in the photo and program code that enlarges and displays a matched face image from the photo.

A third aspect of the disclosure provides a method for processing a photo on a smart device. The method includes detecting when a photo is displayed on the smart device; capturing a viewer image from a front facing camera on the smart device in response to detecting that the photo is being displayed; determining whether the viewer image matches any face images in the photo; and enlarging and displaying a matched face image from the photo.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 depicts an illustrative photo processing example, in accordance with an illustrative embodiment.

FIG. 3 depicts a further illustrative photo processing example, in accordance with an illustrative embodiment.

The drawings are intended to depict only typical aspects of the disclosure, and therefore should not be considered as limiting the scope of the disclosure.

DETAILED DESCRIPTION OF THE DISCLOSURE

Embodiments of the disclosure provide technical solutions for automatically zooming in on a portion of a displayed photo on a smart device that contains the person or persons viewing the photo.

Figure 1:
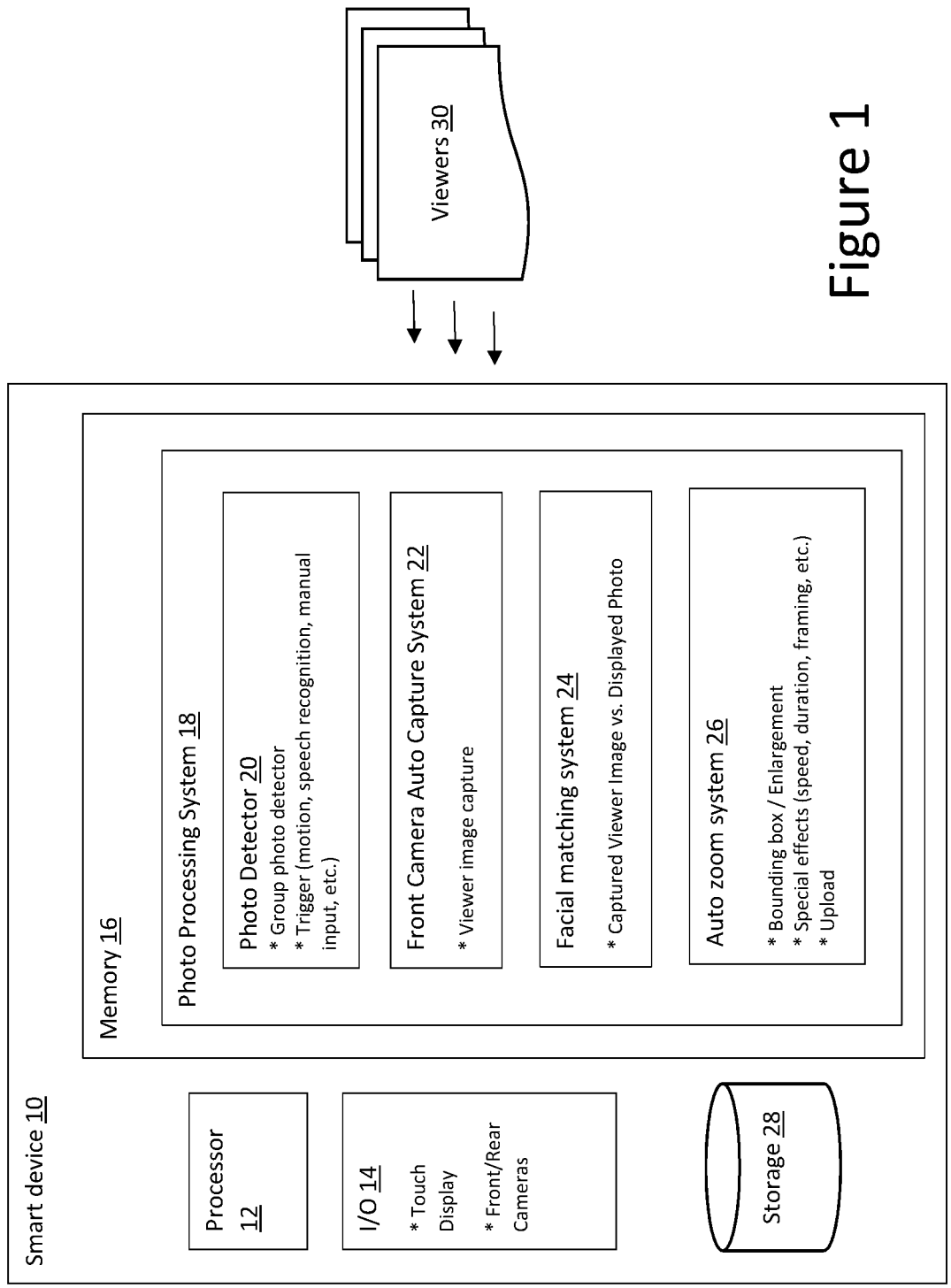
FIG. 1 depicts a smart device having a photo processing system in accordance with an illustrative embodiment.

FIG. 1 depicts an illustrative smart device 10, such as a smart phone, IoT device, etc., that includes a photo processing system 18 that implements an auto zooming feature. Smart device 10 generally includes a processor 12 that executes program code stored in memory 16, including photo processing system 18. Smart device 10 also includes various input/output systems (I/O) 14, including, e.g., a touch display, front and rear facing cameras, speakers, microphone, buttons, etc., as well as storage 28 that stores photos and other user and system data.

Photo processing system 18 generally includes: a photo detector 20 that determines when a photo, e.g., from storage 28, is being shown on the display, a front camera auto capture system 22 that automatically captures a viewer image (i.e., an image of one or more viewers 30 looking at the photo); a facial matching system 24 that determines whether one or more faces in the captured viewer image match any faces in the displayed photo; and an auto zoom system 26 that automatically enlarges a portion of the photo containing a viewer 30 (or viewers of the photo).

Photo detector 20 essentially determines when a photo is suitable for processing by photo processing system 18. In one illustrative embodiment, photo detector 20 may simply determine that any photo being displayed is suitable, and the detection of a displayed photo activates photo processing services including: the front camera auto capture system 22, facial matching system 24 and auto zoom system 26. Determining when a photo is displayed can be determined using any approach, e.g., monitoring when the "Photos" application on the smart device 10 is active.

In a more robust embodiment, photo detector 20 can determine whether a displayed photo comprises a group photo, i.e., a photo that contains multiple faces. In this case, a face detection process, e.g., using a genetic algorithm or eigen-face technique, may be deployed to determine when more than one face exists in the photo. In the case where the photo contains a group photo, photo processing services 22, 24, 26 can be activated. In the case where the photo is not a group photo, then photo processing services 22, 24, 26 can be skipped until a new photo is displayed.

Further triggers may likewise be deployed alone or in combination to determine whether a displayed photo should be processed by services 22, 24, 26. For example, a motion analyzer may be utilized to determine if the smart device 10 has been physically passed from the photographer to another person, or from one viewer 30 to another. For instance, if the smart device 10 is suddenly moved three to 10 feet within 10 seconds of a group photo being taken, photo processing services 22, 24, 26 could be triggered. Alternatively, a speech analyzer could be utilized to determine when the smart device 10 has been passed among viewers 30. For example, recognition of utterances such as "check this shot out" or "can I see the picture" could be used to trigger photo processing services 22, 24, 26. Still further, a manual trigger may be deployed, such as press of a button, shake of the device 10, etc., to activate photo processing services 22, 24, 26.

Regardless, once a photo suitable for processing has been detected, front camera auto capture system 22 automatically captures a viewer image, i.e., one or more faces of the viewer(s) 30 looking at the photo. Any process may be utilized to identify and capture a face from the front facing camera. Once automatically captured, the image can be stored to a temporary cache. Post processing of the captured face may also be utilized to enhance the facial features (e.g., brightness, contrast, etc.).

Once the viewer image is captured from the front facing camera, facial matching system 24 determines if the face in the viewer image matches any faces in the photo. Any type of facial recognition algorithm may be utilized to identify a match. If no match is detected, the process ends.

If a match is detected, then auto zoom system 26 automatically enlarges the area of the photo containing the matched face on the display. Auto zoom system 26 may for example place a bounding box (e.g., a rectangle) around the matched face in the photo, and then enlarge the bounding box until it fills the display or a significant portion of the display. Special effects may be utilized as part of the auto zoom, e.g., a slow motion zoom in/zoom out; decorative framing; etc. Additionally, the presentation of the zoomed photo may last for a predetermined duration, e.g., five seconds, or remain until the device 10 is passed to another viewer 30.

FIG. 2 depicts a simple illustration of the photo processing operation. An original photo 40 having three persons is displayed. Assume one of the persons 42 matches a viewer image taken by the front facing camera. A bounding box is placed around the matched person, which is then enlarged as shown in auto zoomed photo 44. Ancillary tools, such as an upload option 46, may be presented on the display to allow the image viewer to save or share the zoomed image.

FIG. 3 depicts a further illustration of the photo processing operation involving multiple persons viewing the photo. In this example, the original photo 50 is viewed by two persons, which are matched to faces in the photo 50. A single bounding box 52 is placed around both the matches, which is then enlarged as shown in auto zoomed photo 54. In one illustrative embodiment, the auto zoom process will only occur if the two matched faces are adjacent to each other in the photo 50.

Figure 4:
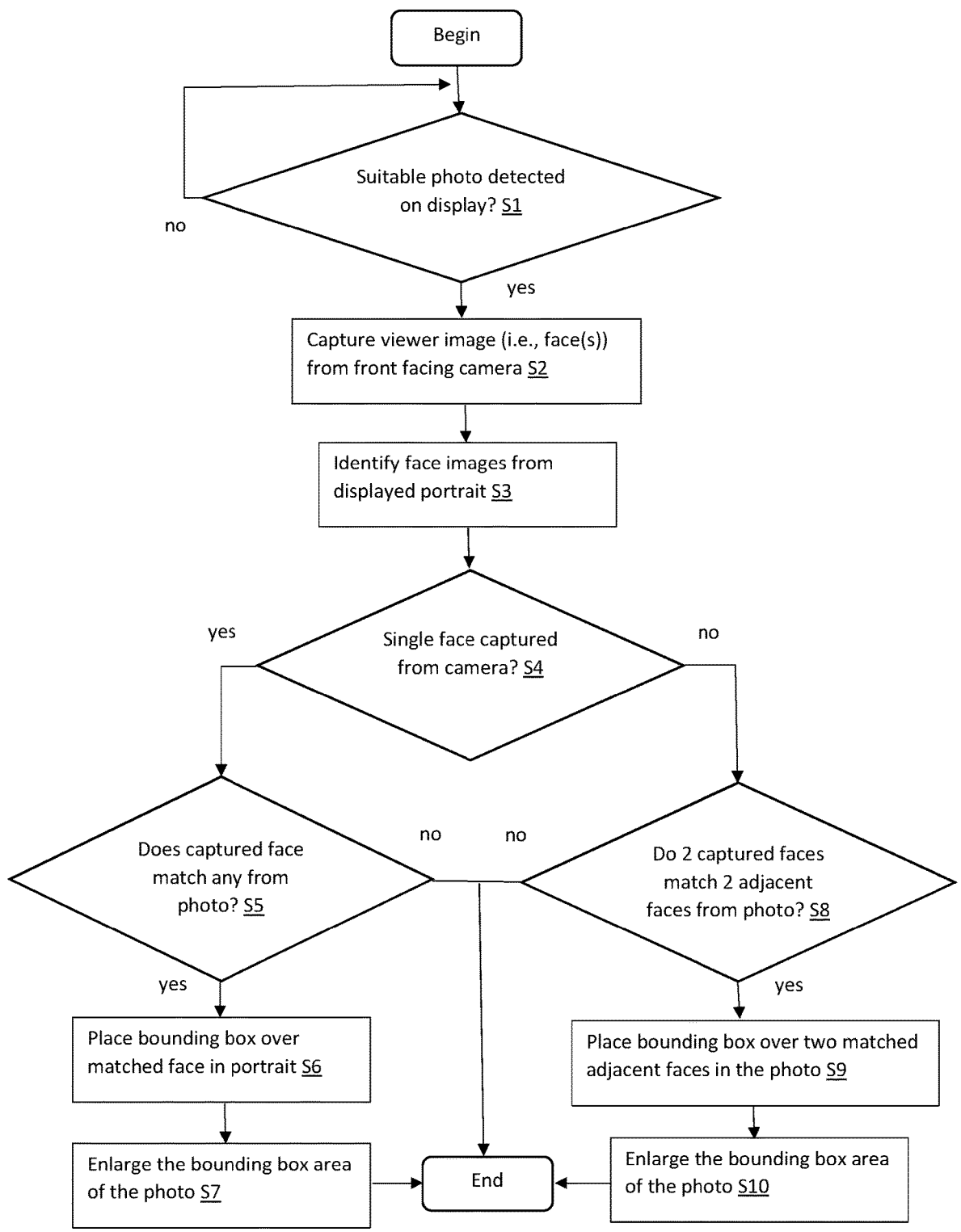
FIG. 4 depicts a flow diagram of a photo processing system, in accordance with an illustrative embodiment.

FIG. 4 depicts an illustrative flow for implementing photo processing system 18 of FIG. 1. At S1, the process loops until a suitable photo (e.g., a group photo) is detected on the display. Next, at S2, a viewer image is captured from the front facing camera and at S3, face images from the photo are identified. At S4, a determination is made whether the viewer image captured from the front facing camera includes a single face or multiple faces. If the viewer image includes a single face at S4, then a determination is made at S5 whether the single face matches any in the photo. If no, the process ends. If yes at S5, then a bounding box is placed oved the matched face in the photo at S6, and at S7 the bounding box area on the photo is enlarged at S7.

If other than a single face is contained in the viewer image at S4, then a determination is made at S8 whether two captured faces in the viewer image match two adjacent faces from the photo (i.e., are the two recognized faces next to each other in the photo). If no at S8, then the process ends. If yes at S8, then a bounding box is placed over the two matched adjacent faces in the photo at S9 and the bounding box area of the photo is enlarged at S10.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

As will be appreciated by one of skill in the art upon reading the following disclosure, various aspects described herein may be embodied as a system, a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Smart device 10 (FIG. 1) may comprise any type of computing device that for example includes at least one processor, memory, an input/output (I/O), e.g., one or more I/O interfaces and/or devices, and a communications pathway or bus. In general, the processor(s) execute program code which is at least partially fixed in memory. While executing program code, the processor(s) can process data, which can result in reading and/or writing transformed data from/to memory and/or I/O for further processing. The pathway provides a communications link between each of the components in the computing device. I/O can comprise one or more human I/O devices, which enable a user to interact with the computing device and the computing device may also be implemented in a distributed manner such that different components reside in different physical locations.

Aspects of photo processing system 18 (FIG. 1) may for example be implemented by a cloud computing environment that employs a network of remote, hosted servers to manage, store and/or process data, and may generally be referred to, or fall under the umbrella of, a "network service." The cloud computing environment may include a network of interconnected nodes, and provide a number of services, for example hosting deployment of customer-provided software, hosting deployment of provider-supported software, and/or providing infrastructure. In general, cloud computing environments are typically owned and operated by a third-party organization providing cloud services (e.g., Amazon Web Services, Microsoft Azure, etc.), while on-premises computing environments are typically owned and operated by the organization that is using the computing environment. Cloud computing environments may have a variety of deployment types. For example, a cloud computing environment may be a public cloud where the cloud infrastructure is made available to the general public or particular sub-group. Alternatively, a cloud computing environment may be a private cloud where the cloud infrastructure is operated solely for a single customer or organization or for a limited community of organizations having shared concerns (e.g., security and/or compliance limitations, policy, and/or mission). A cloud computing environment may also be implemented as a combination of two or more cloud environments, at least one being a private cloud environment and at least one being a public cloud environment. Further, the various cloud computing environment deployment types may be combined with one or more on-premises computing environments in a hybrid configuration.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A smart device having a photo processing system, comprising:
   a detector that detects when a previously captured photo is displayed on the smart device;
   an auto capture system that captures a viewer image of a person viewing the previously captured photo from a front facing camera on the smart device in response to detecting that the previously captured photo is being displayed;
   a facial matching system that determines whether the viewer image matches any face images in the previously captured photo; and
   an auto zoom system that enlarges and displays a matched face image from the previously captured photo.

2. The smart device of claim 1, wherein the detector analyzes the photo using a face detection algorithm to determine whether the photo comprises a group photo.

3. The smart device of claim 2, wherein the auto capture system, facial matching system and auto zoom system are activated only when the photo comprises a group photo.

4. The smart device of claim 1, wherein the facial matching system uses facial recognition.

5. The smart device of claim 1, wherein the auto zoom system places a bounding box around the matched face image and then enlarges an area of the photo in the bounding box.

6. The smart device of claim 1, wherein the facial matching system determines whether the viewer image includes two captured face images and in response to a determination of two captured face images, the facial matching system determines whether the two captured face images match two face images in the photo.

7. The smart device of claim 6, wherein, in response to the two captured face images matching two face images in the photo, the auto zoom system places a bounding box around both face images in the photo and enlarges an area of the photo in the bounding box.

8. A computer program product stored on a non-transitory computer readable storage medium, which when executed by a processor on a smart device, processes photos, wherein the computer program product comprises:
   program code that detects when a previously captured photo is displayed on the smart device by determining if a photo display app on the smart device is active;
   program code that captures a viewer image of a person viewing the photo from a front facing camera on the smart device in response to detecting that the photo is being displayed;
   program code that determines whether the viewer image matches any face images in the photo; and
   program code that enlarges and displays a matched face image from the photo.

9. The program product of claim 8, wherein the program code that detects when the photo is displayed further analyzes the photo using a face detection algorithm to determine whether the photo comprises a group photo.

10. The program product of claim 9, further comprising program code that causes the program product to exit further processing of the photo if the photo is not a group photo.

11. The program product of claim 8, wherein the program code that determines whether the viewer image matches any face images in the photo uses facial recognition.

12. The program product of claim 8, wherein the program code that enlarges and displays places a bounding box around the matched face image and then enlarges an area in of the photo in the bounding box.

13. The program product of claim 8, further comprising program code that determines whether the viewer image includes two captured face images and in response to a determination of two captured face images, determines whether the two captured face images match two face images in the photo.

14. The program product of claim 13, further comprising program code that, in response to the two captured face images matching two face images in the photo, places a bounding box around both face images in the photo and enlarges an area of the photo in the bounding box.

15. A method for processing a photo on a smart device, comprising:

detecting when a previously captured photo is displayed on the smart device in response to a determination that the smart device has been passed among a set of viewers by at least one of a motion analyzer or a speech analyzer;

capturing a viewer image from a front facing camera of a person viewing the photo on the smart device in response to detecting that the photo is being displayed;

determining whether the viewer image matches any face images in the photo; and enlarging and displaying a matched face image from the photo.

16. The method of claim 15, wherein the detecting analyzes the photo using a face detection algorithm to determine whether the photo comprises a group photo.

17. The method of claim 16, further comprising exiting further processing the photo if the photo is not a group photo.

18. The method of claim 15, wherein the zooming includes placing a bounding box around the matched face image and then enlarging an area of the photo in the bounding box.

19. The method of claim 15, further comprising determining whether the viewer image includes two captured face images and in response to a determination of two captured face images, determining whether the two captured face images match two face images in the photo.

20. The method of claim 19, wherein, in response to the two captured face images matching two face images in the photo, placing a bounding box around both face images in the photo and enlarging an area of the photo in the bounding box.

* * * * *